United States Patent Office 3,113,243
Patented Dec. 3, 1963

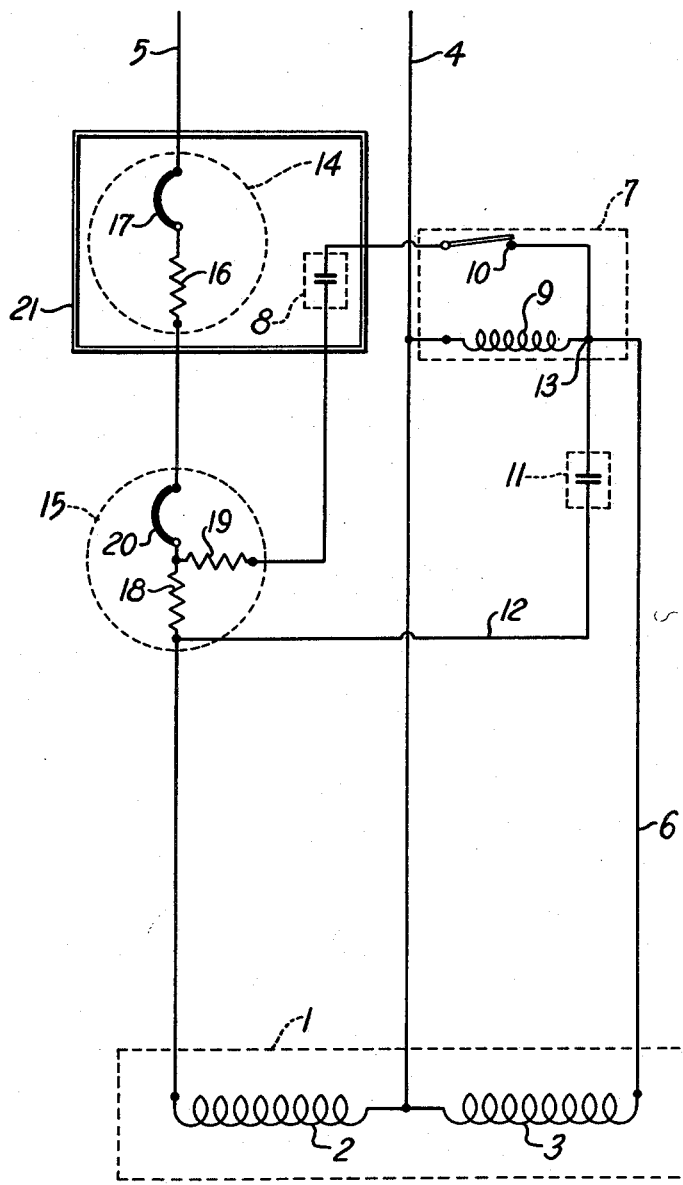

3,113,243
OVERLOAD PROTECTION DEVICE
Clinton A. Boyd, Delavan, Wis., assignor to Sta-Rite Products, Inc., Delavan, Wis., a corporation of Wisconsin
Filed Feb. 9, 1959, Ser. No. 791,872
6 Claims. (Cl. 317—13)

This invention relates to an overload protection device for an electrical apparatus and more particularly to an overload protector for a motor.

In general, overload protectors for an electrical circuit are either of the manual resetting or automatic resetting types. In the manual resetting overload protector, any fault causing a high overload current flow will open the circuit to the motor or other electrical apparatus and the circuit will remain open until the overload protector is manually reset or closed. The manual resetting overload has a disadvantage in that if the fault is temporary, such as a momentary low or high voltage condition, the overload will not automatically reset and thus, the overload protector must be manually closed and this, in many instances, is inconvenient.

With the automatic resetting overload protector, the heat responsive overload protector will open the circuit during high overload current flow and, with the circuit open, the overload protector will cool and automatically close. In the case where the fault is permanent, such as a water logged pressure tank in a water system, the automatic overload protector will continually open and close and this cycling will continue until the fault is corrected. In many cases, prolonged periods of cycling will occur before the fault is corrected and this, of course, results in an undue strain on the overload protector.

The present invention is directed to an overload protection system for an electrical device having both a manual and automatic overload protector. The automatic setting overload protector is set for a lower temperature than the manual setting overload protector and means is included for providing a differential in the rate of heat transfer or dissipation from the manual and automatic overload protectors, whereby the heat is dissipated from the automatic overload protector at a much faster rate than from the manual overload protector. If a permanent fault exists, the automatic overload protector will continue to cycle and as the heat is dissipated more rapidly from the automatic overload protector than from the manual overload protector, the temperature of the manual overload protector will continue to rise until it reaches the given temperature setting at which time the manual overload protector will open the circuit. When this occurs, the circuit will remain open until the manual overload protector is manually reset.

With the use of both an automatic and a manual overload in the circuit, the automatic overload protector will automatically reset or close the circuit when a temporary fault is corrected. If the fault is of a prolonged or permanent nature, the automatic overload protector will continue to cycle until the temperature of the manual overload protector reaches its set value at which time the manual overload protector will permanently open the circuit. Thus, with a permanent type of fault, the use of the manual overload in series with the automatic overload protector will limit the period of cycling of the automatic overload protector.

Other objects and advantages will appear in the course of the following description.

The drawing illustrates the best mode presently contemplated for carrying out the invention.

The drawing is a schematic representation of the wiring diagram for a single phase motor and incorporating the overload protection device of the invention.

The drawing illustrates an overload protection device as applied to a single phase electrical motor 1. The motor, as shown, is a capacitor start, induction motor having a main winding 2 and an auxiliary winding 3. One end of both the main winding 2 and the auxiliary winding 3 is connected to power line 4, while the other end of main winding 2 is connected to power line 5.

The other end of the auxiliary winding 3 is connected by line 6 through a relay 7 and starting capacitor 8 to power line 5.

The relay 7 includes a coil 9 having one end connected to power line 4, and a pair of contacts 10 which are electro-magnetically operable by the coil 9.

In addition to the starting capacitor 8, a running capacitor 11 is connected by line 12 in parallel with the starting capacitor 8 and relay 7. One end of line 12 is connected to the terminal 13 of relay 7 and the other end of line 12 is connected to power line 5 at a location spaced from the connection of line 6 to power line 5 in the direction toward the main winding 2.

On starting the motor, the greatest portion of current flow to the auxiliary winding 3 will be through starting capacitor 8 and relay 7. As the motor increases in speed, the higher voltage impressed across coil 9 will open contacts 10 and take the starting capacitor out of the circuit to the auxiliary winding. With the starting capacitor out of the circuit, the entire current flow will be through the running capacitor 11 to the auxiliary winding. The running capacitor serves to provide a better power factor during the running cycle.

According to the invention, a manual resetting overload protector 14 and an automatic resetting overload protector 15 are connected in series in the power line 5. The manual overload protector 14 includes a low resistance heating element 16 and a heat responsive switch 17, while the automatic overload protector 15 includes a low resistance heating element 18 connected in the main circuit, a low resistance heating element 19 connected in the circuit to the auxiliary winding and a heat responsive switch 20 which is actuated by the heating elements 18 and 19.

The heating element 16 in manual overload protector 14 is responsive to the total current to the motor, while the heating element 18 is responsive to the current to the main winding 2 and the heating element 19 is responsive to the current flowing to the auxiliary winding.

The heat responsive switch 17 in the manual overload protector 14 is set to open at a substantially higher temperature than the switch 20 in the automatic overload protector 15. The current flow, under normal conditions, through heating elements 16, 18 and 19 does not generate sufficient heat to actuate switches 17 and 20. It is only under overload current flow that the heating elements 16, 18 and 19 will develop sufficient heat to actuate the respective switches.

In order to provide a differential in the rate of heat dissipation from the manual overload protector 14 as compared to the automatic overload protector 15 so that the manual overload protector will heat up and open after a predetermined period of cycling of the automatic overload protector, an insulating cover 21 is disposed over the manual overload protector 14 and the starting capacitor 8. In the case of a permanent fault, the automatic overload protector will cycle and on each resetting or closing of the auxiliary winding circuit, the current passing through the starting capacitor 8 will generate heat which will be transferred to the manual overload protector 14 due to the insulating cover 21. This transfer of heat in conjunction with the heat developed by element 16 will gradually raise the temperature of the manual overload protector until the temperature setting of the switch 17 is reached and the switch 17 will then open.

The cover 21 can be formed of any desired material. However, the use of a heat insulating material for cover 21 will provide the most effective differential in the rate of heat transfer between manual overload protector 14 and automatic overload protector 15.

It is contemplated that the insulating cover 21 may enclose only the manual overload protector 14 itself and in this case, the heat developed by the heating element 16 will be retained and not transferred to outside objects so that the temperature of the overload protector will gradually rise during cycling of the automatic overload protector 15 until the switch 17 is opened. With this construction, the period of cycling of the automatic overload protector before switch 17 of the manual overload protector opens will be greater than when the insulating cover 21 encloses both the manual overload protector 14 and the starting capacitor 8.

It is also contemplated that the differential in the rate of heat dissipation can be accomplished by cooling the automatic overload protector 15 instead of covering or insulating the manual overload protector 14. In this case, cooling fins or other heat dissipating structure can be associated with the automatic overload protector so that the switch 20 will be cooled more rapidly and the cycling of the automatic overload protector will be more frequent. This again will result in a gradual rise in temperature of the manual overload protector 14 to a point where the switch 17 will open.

In the case of a temporary fault, such as a low or high voltage condition or a locked rotor, the overload current flow will cause the heating elements 18 or 19 to generate sufficient heat to open switch 20 of the automatic overload protector to stop the motor. The switch 20 will then cool and subsequently close the circuit and restart the motor. If the temporary fault has not been corrected, the switch 20 will again open due to the overload current flow and this opening and closing, or cycling, of switch 20 will continue until the fault is corrected.

In the case of a prolonged or permanent type of fault, such as a water logged tank, grounded cable or the like, the automatic overload protector 15 will continue to cycle until the temperature of the switch 17 of motor overload protector 14 is raised to its setting and then switch 17 will open to permanently open the circuit and stop the motor. The motor can then only be started by manually closing switch 17 of the overload protector 14.

The overload protection device of the invention protects both the main winding through heating element 18 and the auxiliary winding by virtue of heating element 19. Thus, for example, if a fault should occur in the auxiliary winding circuit after starting of the motor, such as a defect in relay 7 which prevents the relay from opening, the high current flow in the auxiliary circuit will cause heating element 19 to generate sufficient heat to open the switch 20 and thereby stop the motor. As previously described, the cycling of the automatic overload protector will continue until the temperature of the manual overload protector has risen sufficiently to open switch 17.

While the above description discloses the switch 17 of the manual overload protector being set to open at a higher temperature than the switch 20 of the automatic overload protector, it is contemplated that the switches 17 and 20 can be set to open at the same temperature. However, in a case such as this, the heating elements 18 and 19 of the automatic overload protector would be adjusted to heat more rapidly than heating element 16 of the manual overload protector. Again, the rate of heat transfer from the automatic overload protector would have to be greater than the heat transfer from the manual protector in order for the manual protector to open upon recycling of the automatic protector.

The present invention, which incorporates both a manual resetting overload protector and an automatic resetting overload protector, will automatically correct temporary faults without manual resetting but will permanently stop the motor or other electrical apparatus after a given number of cycles of the automatic overload protector. The manual overload protector is responsive to a higher temperature than the automatic overload protector and a means is provided for dissipating the heat from the automatic overload protector at a more rapid rate than from the manual overload protector so that a given period of cycling of the automatic overload protector will actuate the manual overload protector to open the circuit to the motor windings.

Various modes of carrying out the invention are contemplated as being within the scope of the following claims particularly pointing out and distinctly claiming the subject matter which is regarded as the invention.

I claim:

1. In a control circuit for an electrical apparatus, a manual resetting heat responsive overload protector connected in the control circuit in series with the electrical apparatus and operable during starting and normal operation of the apparatus by a given temperature developed by overload current flow in the circuit to open the connection to said electrical apparatus, an automatic resetting heat responsive overload protector connected in the circuit in series with said manual overload protector and operable during starting and normal operation of the apparatus at a second given temperature developed by sustained overload current flow in the circuit to thereby open the connection to the apparatus, and enclosure means covering said manual overload protector and decreasing the rate of heat transfer therefrom below the rate of heat transfer from said automatic overload protector to thereby effect a continual increase in temperature of said manual overload protector to said first given temperature during cyclic resetting of said automatic overload protector and thus open and hold open the connection to said apparatus.

2. In combination with a single phase electric motor having a main winding and an auxiliary winding, a manual resettable heat responsive overload protector connected in series with said windings and operable during starting and normal operation of the motor by a given high temperature produced by sustained overload current flow to said windings to open the connection thereto, an automatic resettable heat responsive overload protector connected in series with said windings and operable during starting and normal operation of the motor by a second given high temperature produced by sustained overload current to the windings to open the connection thereto, said second temperature being substantially lower than said first temperature, a starting capacitor connected in series with said auxiliary winding and said automatic overload protector, switch means connected in series with said starting capacitor for opening the connection to said auxiliary winding after a predetermined period of operation of said motor, and means for dissipating the heat from the automatic overload protector at a faster rate than from the manual overload protector to thereby effect a continual increase in temperature of said manual overload protector to said first given temperature during cyclic resetting of said automatic overload protector and thus open and hold open the connection to said windings.

3. In combination with a single phase electric motor having a main winding and an auxiliary winding, a manual resettable heat responsive overload protector connected in series with said windings and operable during starting and normal operation of the motor by a given high temperature produced by sustained overload current flow to said windings to open the connection thereto, an automatic resettable heat responsive overload protector connected in series with said windings and operable during starting and normal operation of the motor by a second given high temperature produced by sustained overload current to the windings to open the connection thereto, said second temperature being substantially lower than said first temperature, a starting capacitor connected in series with said auxiliary winding and said automatic overload protector, switch means connected in series with said starting capacitor for opening the connection to said auxiliary winding after a predetermined period of operation of said motor, and a heat insulating cover enclosing the manual overload protector and the starting capacitor and said automatic overload protector being free of an insulating cover, whereby heat generated by the starting capacitor during recycling of the automatic overload protector is transferred to the manual overload protector to raise the temperature of said manual overload protector to said first given temperature and thus open and hold open the connection to said windings.

4. Apparatus for protecting an electric motor against overload conditions, comprising a circuit breaker including an automatic reset thermostatic switch and a manual reset thermostatic switch, said automatic thermostatic switch and said manual thermostatic switch each comprising a thermostatic element carrying a pair of spaced-apart electrical contacts adapted to bridge a pair of stationary electrical contacts, said automatic thermostatic switch and said manual thermostatic switch being serially connected in an electrical circuit for connection between a source of electrical power and said motor, each of said thermostatic switches having a respective operating temperature which when exceeded will actuate the respective thermostatic switch to open said circuit, said thermostatic element constituting an electrically resistant path for conduction of current therethrough thereby to heat said automatic switch in response to the magnitude of current drawn by said motor, an electrical heater unit serially connected in said electrical circuit and positioned in heat-exchange relationship with said manual thermostatic switch thereby to heat said manual switch in response to the magnitude of current drawn by said motor, said manual thermostatic switch having a substantially higher thermal mass than said automatic switch, whereby upon said motor current continuing to exceed a predetermined value said automatic switch will automatically open and reclose said circuit sequentially for a period of time and thereafter unless the motor current drops below said predetermined level the manual reset thermostatic switch will be actuated to open said circuit.

5. In a control circuit for an electrical apparatus, a manual resetting heat responsive overload protector connected in the control circuit in series with the electrical apparatus and operable during starting and normal operation of the apparatus by a given temperature developed by overload current flow in the circuit to open the connection to said electrical apparatus, an automatic resetting heat responsive overload protector connected in the circuit in series with said manual overload protector and operable during starting and normal operation of the apparatus at a second given temperature substantially lower than said first named temperature to thereby open the connection to said electrical apparatus, whereby sustained overload current flow to said apparatus heats said automatic protector above said second given temperature to open said connection and on cooling beneath said second given temperature due to termination of said overload current flow said automatic overload protector resets to restore the connection to said apparatus, and a heating unit connected in said circuit in series with said manual overload protector and said automatic overload protector, said heating unit being separate from said manual overload protector and positioned in heat exchange relationship with said manual overload protector whereby heat produced by said heating unit is transferred to said manual overload protector to thereby effect a continual increase in temperature of said manual overload protector to said first given temperature during cyclic resetting of said automatic overload protector to thereby open and hold open the connections to said apparatus.

6. In a control circuit for an electrical apparatus, automatic reset thermostatic switch means connected in said control circuit, manual reset thermostatic switch means connected in said circuit in series with said automatic thermostatic switch means, each of said thermostatic switch means having a respective operating temperature which when exceeded will actuate the respective thermostatic switch means to open said circuit, and an eletcrical heater unit separate from said manual thermostatic switch means and serially connected in said circuit and positioned in heat exchange relationship with said manual thermostatic switch means whereby heat generated by said heater unit will heat said manual thermostatic switch means in response to the magnitude of current drawn by said electrical apparatus, said manual thermostatic switch means having a substantially higher thermal mass than said automatic thermostatic switch means whereby upon said current continuing to exceed a predetermined value said automatic switch means will automatically open and reclose said circuit sequentially for a period of time and thereafter unless the current drops below said predetermined level the manual switch means will be actuated to permanently open said circuit.

References Cited in the file of this patent

UNITED STATES PATENTS

| | | |
|---|---|---|
| 2,117,123 | Werner | May 10, 1938 |
| 2,318,076 | Johns | May 4, 1943 |
| 2,398,993 | Ayers | Apr. 23, 1946 |
| 2,426,906 | Vaughan | Sept. 2, 1947 |
| 2,752,548 | Seely | June 26, 1956 |
| 2,794,161 | Schaefer | May 28, 1957 |